(12) United States Patent
Dimmler et al.

(10) Patent No.: US 11,390,003 B2
(45) Date of Patent: Jul. 19, 2022

(54) INJECTION UNIT FOR A SHAPING MACHINE

(71) Applicant: ENGEL AUSTRIA GmbH, Schwertberg (AT)

(72) Inventors: Gerhard Dimmler, Steinhaus (AT); Christoph Balka, Schwertberg (AT); Friedrich Pernkopf, Gramastetten (AT)

(73) Assignee: ENGEL AUSTRIA GmbH, Schwertberg (AT)

( * ) Notice: Subject to any disclaimer, the term of this patent is extended or adjusted under 35 U.S.C. 154(b) by 0 days.

(21) Appl. No.: 17/501,246

(22) Filed: Oct. 14, 2021

(65) Prior Publication Data
US 2022/0118666 A1 Apr. 21, 2022

(30) Foreign Application Priority Data
Oct. 15, 2020 (AT) .............. A 50887/2020

(51) Int. Cl.
*B29C 45/83* (2006.01)
*B29C 45/72* (2006.01)
*B29C 45/53* (2006.01)

(52) U.S. Cl.
CPC ............ *B29C 45/83* (2013.01); *B29C 45/531* (2013.01); *B29C 45/72* (2013.01); *B29C 2045/7271* (2013.01); *B29C 2045/835* (2013.01)

(58) Field of Classification Search
CPC ....... B29C 45/83; B29C 45/531; B29C 45/54; B24B 23/043
See application file for complete search history.

(56) References Cited

U.S. PATENT DOCUMENTS

| | | | | |
|---|---|---|---|---|
| 3,738,618 A | * | 6/1973 | Hehl | B29C 45/83 366/79 |
| 3,833,204 A | | 9/1974 | Hehl | |
| 4,208,879 A | * | 6/1980 | Segawa | B22D 17/32 164/314 |
| 5,474,733 A | * | 12/1995 | Koide | B29C 45/5008 264/328.1 |

FOREIGN PATENT DOCUMENTS

| | | |
|---|---|---|
| DE | 2 112 996 | 9/1972 |
| DE | 10 2020 100 664 | 7/2020 |
| JP | 2002-28961 | 1/2002 |

\* cited by examiner

*Primary Examiner* — Alison L Hindenlang
*Assistant Examiner* — Debjani Roy
(74) *Attorney, Agent, or Firm* — Wenderoth, Lind & Ponack, L.L.P.

(57) ABSTRACT

An injection unit for a shaping machine includes an injection piston arranged displaceably in an injection cylinder and at least two drive units for displacement of the injection piston. Each of the at least two drive units is lubricated by an oil chamber which is oil-tightly sealed off in relation to the surroundings, and each oil chamber holds an oil volume, above which is arranged an air volume. The air volumes of the oil chambers are connected together in air-conducting relationship by a connecting conduit.

7 Claims, 5 Drawing Sheets

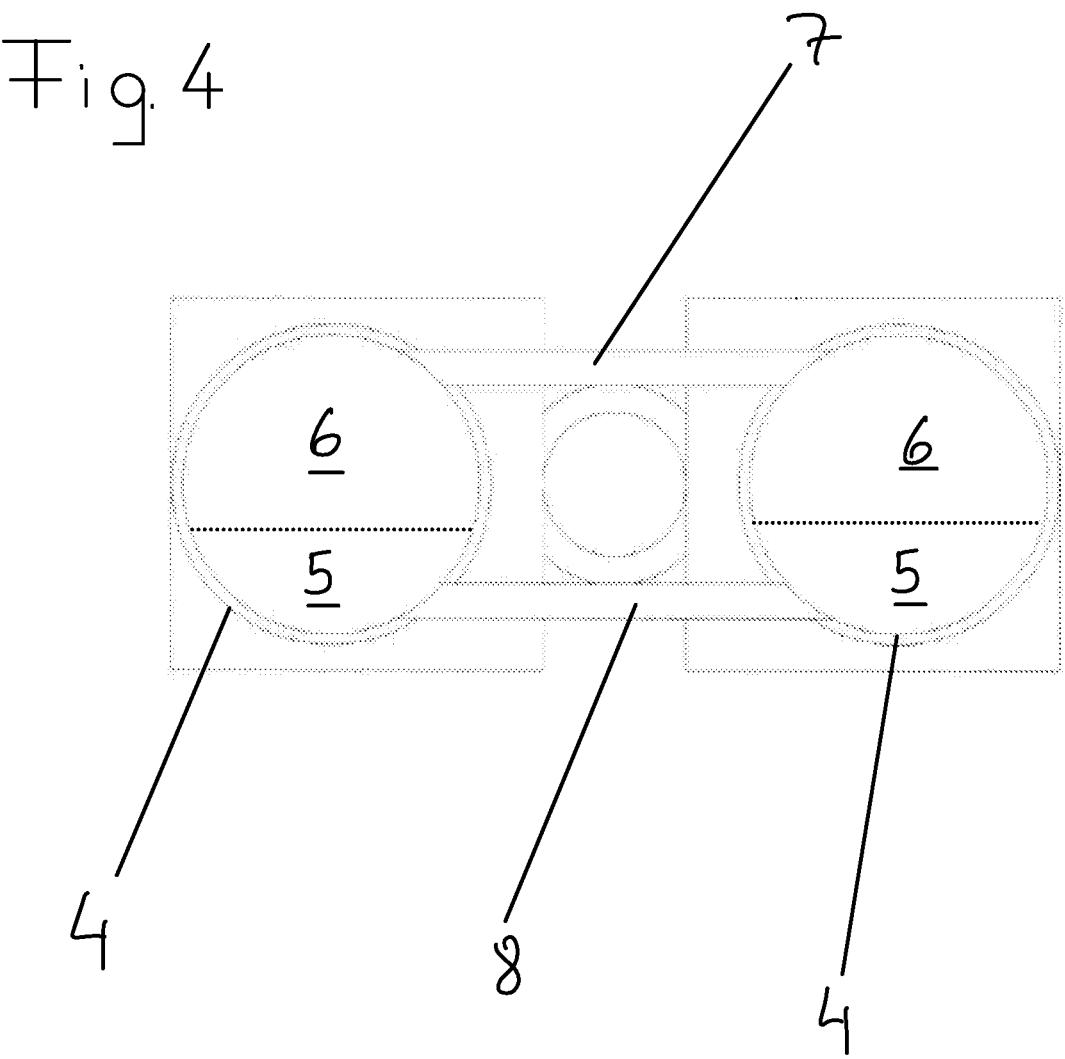

INJECTION UNIT FOR A SHAPING MACHINE

BACKGROUND OF THE INVENTION

The invention concerns an injection unit for a shaping machine, and a shaping machine comprising such an injection unit.

Injection units of the general kind set forth have long been known, an embodiment being disclosed in DE 10 2020 100 664 A1.

The loading on the drive units (in particular in the high-performance area with ever shorter cycle times), which can include for example respective ball screw drives, results in increased temperature stresses. It is therefore known for the oil chambers of the drive units, which in themselves are separate, to be connected together by at least one oil line and for the oil to be circulated in the oil chambers by means of a pump to improve the dissipation of heat. By virtue of a pump action which occurs in operation of the drive units it can happen that the amounts of oil in the oil chambers and thus the oil levels of the oil volumes differ from each other, which can cause various problems, for example in the extreme case one of the drive units runs dry because of inadequate lubrication.

SUMMARY OF THE INVENTION

The object of the invention is to provide an injection unit of the general kind set forth and a shaping machine having such an injection unit, in which the above-discussed problems are avoided.

That object is attained by an injection unit and a shaping machine comprising such an injection unit (preferably a plastic injection molding machine).

An injection unit for a shaping machine has an injection piston arranged displaceably in an injection cylinder and at least two drive units for displacement of the injection piston, which for example each have a respective ball screw drive. Each drive unit is respectively lubricated by an oil chamber which is oil-tightly sealed off in relation to the surroundings. Each oil chamber contains an oil volume, above which an air volume is arranged (for the at least two drive units therefore there are provided separate oil chambers). The air volumes of the oil chambers are connected together in air-conducting relationship by at least one connecting conduit, thereby ensuring that the oil levels in the different oil chambers can balance each other out so that the same amount of oil is disposed at least substantially in both oil chambers.

In a known manner, the injection piston can be in the form of a plasticizing screw, in particular when the injection unit is part of a shaping machine in the form of a plastic injection molding machine. Then, besides the at least two drive units for displacement of the plasticizing screw, there is also at least one further drive unit in the form of a rotary drive for rotating the plasticizing screw.

In an embodiment of the invention, the connecting conduit includes two portions which respectively extend from one of the oil chambers to a connecting point and meet at the connecting point at an angle different from zero. If an intake of oil into the connecting conduit should occur the oil can flow back under the influence of the force of gravity into an oil chamber along one of the portions.

In an embodiment of the invention, at least one oil conduit connects the oil volumes of the oil chambers together. Then preferably, the at least one oil conduit is part of an oil circuit which has at least one pump and preferably at least one heat exchanger.

In an embodiment of the invention, the at least two drive units respectively have a ball screw drive or a toothed rack drive or a roller screw drive or other operatively equivalent machine elements.

In an embodiment of the invention, arranged in at least one of the oil chambers is:
at least one cooling element, preferably a cooling element having a cooling medium flowing therethrough, and/or
at least one Peltier element for introducing a heat quantity, whereby temperature control of the oil is enabled.

BRIEF DESCRIPTION OF THE DRAWINGS

Embodiments of the invention are discussed with reference to the Figures, in which:

FIG. 4 is a side view of a sectional illustration along a vertical plane in FIG. 1, in which it is possible to see the oil chambers.

DETAILED DESCRIPTION OF THE INVENTION

Figure 1:
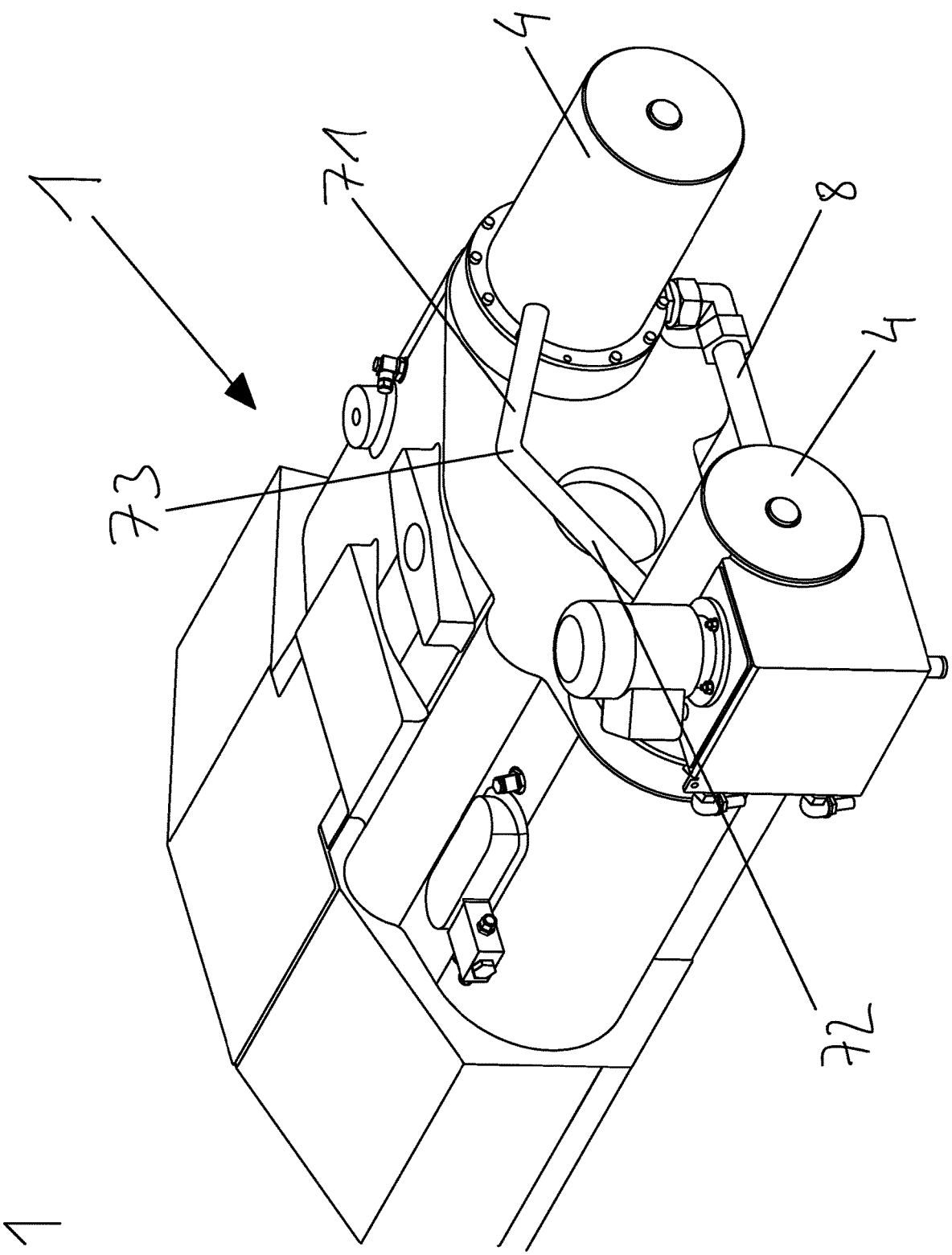
FIG. 1 is a an isometric view of an injection unit.

The Figures show an injection unit 1 for a shaping machine (for example for a plastic injection molding machine which is not shown in greater detail because it corresponds to the state of the art) comprising an injection piston 2 arranged displaceably in an injection cylinder (here in the form of a plasticizing screw, the plasticizing cylinder and the injection piston 2 are not shown in FIG. 1) and at least two drive units 3 for displacement of the injection piston 2, that in this embodiment each have a ball screw drive 31, 32 which is respectively lubricated by means of an oil chamber 4 which is oil-tightly sealed off with respect to the surroundings, wherein each oil chamber 4 contains an oil volume 5, above which is arranged an air volume 6 (the oil chambers 4 are therefore only partially filled with oil) and wherein the air volumes 6 of the oil chambers 4 are connected together in air-conducting relationship by at least one connecting conduit 7.

The two ball screw drives 31, 32 each have a spindle 31 which is axially stationary and rotatable by a motor 33 and which cooperates with a nut 32 which is non-rotatably mounted to an injection bridge 10 and is axially displaceable jointly therewith. The spindles 31 are mounted in a common bearing 34. Oil lubrication of the nut 32 and the spindle 31 (as far as the region in which seals can be seen) is respectively effected by way of the oil chamber 4 into which the spindle 31 projects with its free—non-driven—end.

The oil chambers 4 are fixed to the injection bridge 10 and are sized with such an axial extent that they do not impede the translatory movement of the injection bridge 10.

A rotary drive 9 is provided for the injection piston 2 which is in the form of a plasticizing screw.

Figure 2:
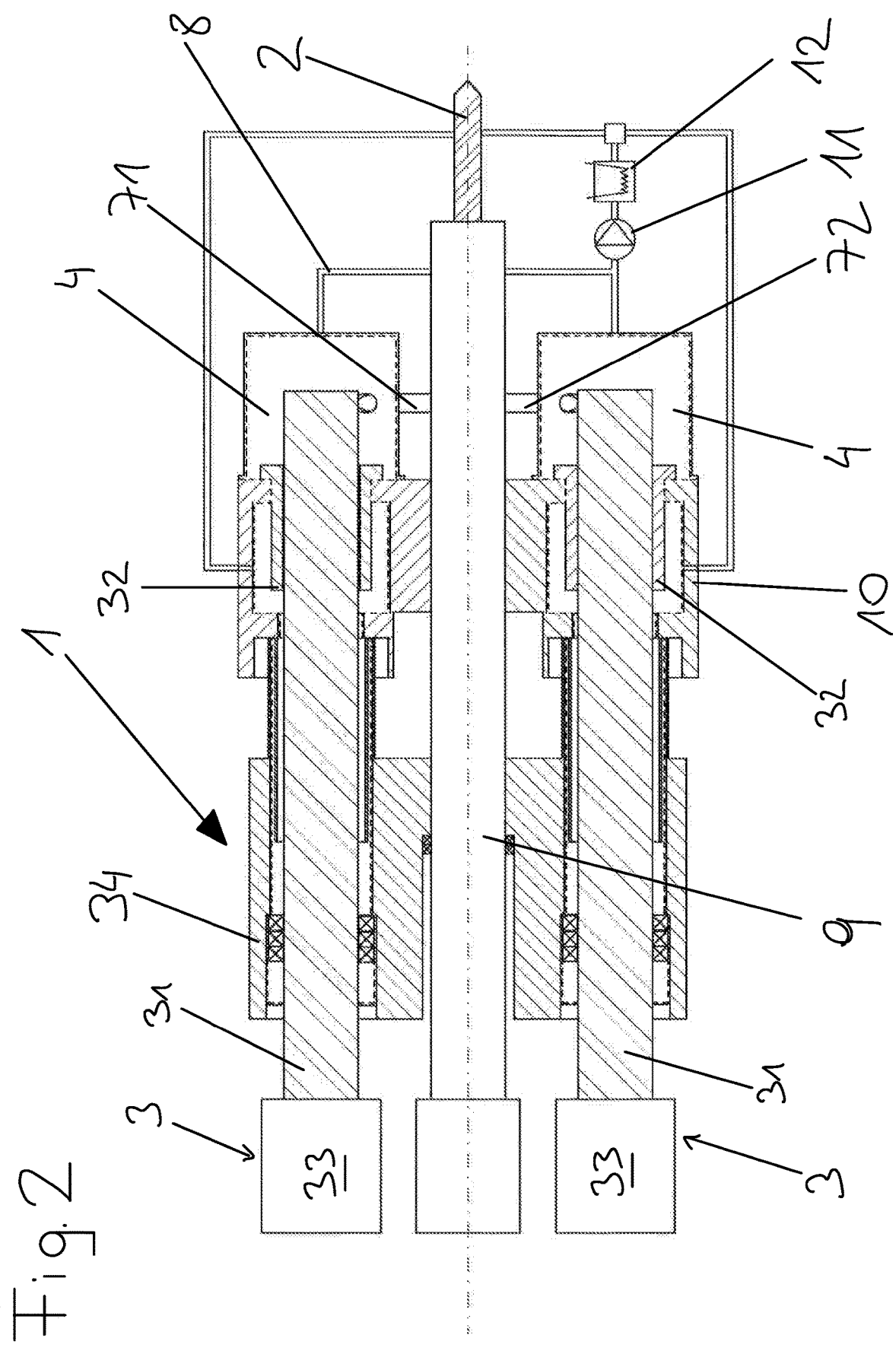
FIG. 2 is a sectional view of the injection unit of FIG. 1 along a horizontal plane in FIG. 1.
Figure 3:
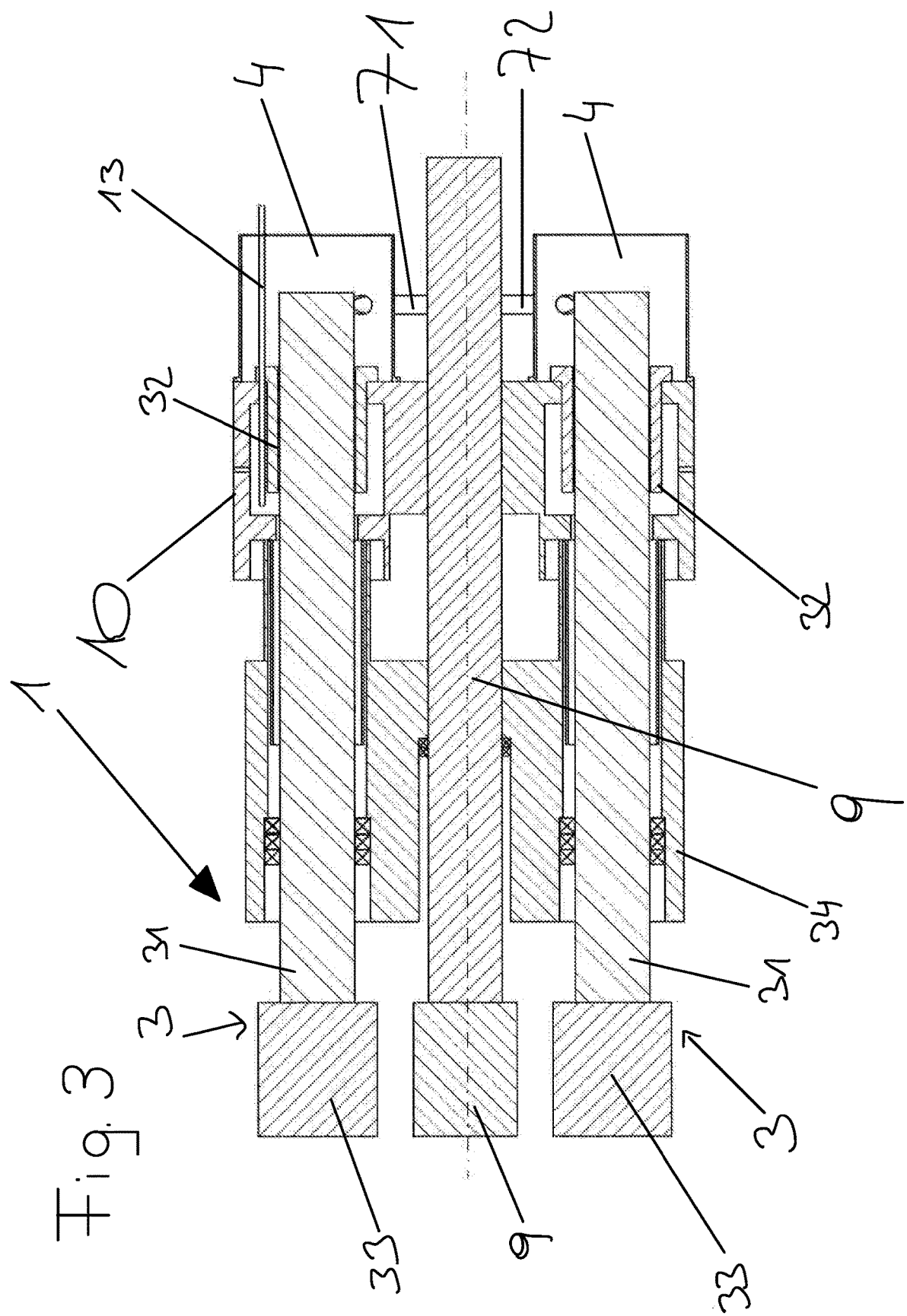
FIG. 3 is a sectional view of the injection unit of a further embodiment along a horizontal plane in FIG. 1.

In the embodiment of FIGS. 1 through 3 the connecting conduit includes two portions 71, 72 which respectively extend from one of the oil chambers 4 to a connecting point 73 and meet in the connecting point 73 at an angle different from zero. Here the two portions 71, 72 are each in the form of straight pipe portions. The portions 71, 72 can be part of a reshaped single pipe or straight pipes which are connected together by a pipe connector in the form of an knee.

In all illustrated embodiments, an oil conduit 8 connects the oil volumes 5 of the oil chambers 4 together.

In the embodiment of FIG. 2, the oil conduit 8 is part of an oil circuit which has at least one pump 11 and at least one heat exchanger 12. In this embodiment, oil is removed at the end sides of the oil chambers 4 and fed back after cooling in the region of the nuts 32. The illustration of the oil circuit is to be interpreted schematically, it can include (rigid) pipes and (flexible) hoses, in particular to adapt to displacement of the injection bridge 10.

In the embodiment shown in FIG. 3, arranged in at least one of the oil chambers 4 (here in precisely one) is:
- at least one cooling element 13, preferably a cooling element 13 having a cooling medium (for example water) flowing therethrough, and/or
- at least one Peltier element for the introduction of a heat quantity.

The features of the embodiments of FIGS. 2 and 3 can naturally be combined together.

The divisions of the cylindrical oil chambers 4 into oil volumes 5 and air volumes 6 can be seen from FIG. 4 and one can see that the air volumes 6 are connected together in air-conducting relationship by a connecting conduit 7 which here is in the form of a straight pipe portion without oil being able to pass into the connecting conduit 7.

Figure 5A:
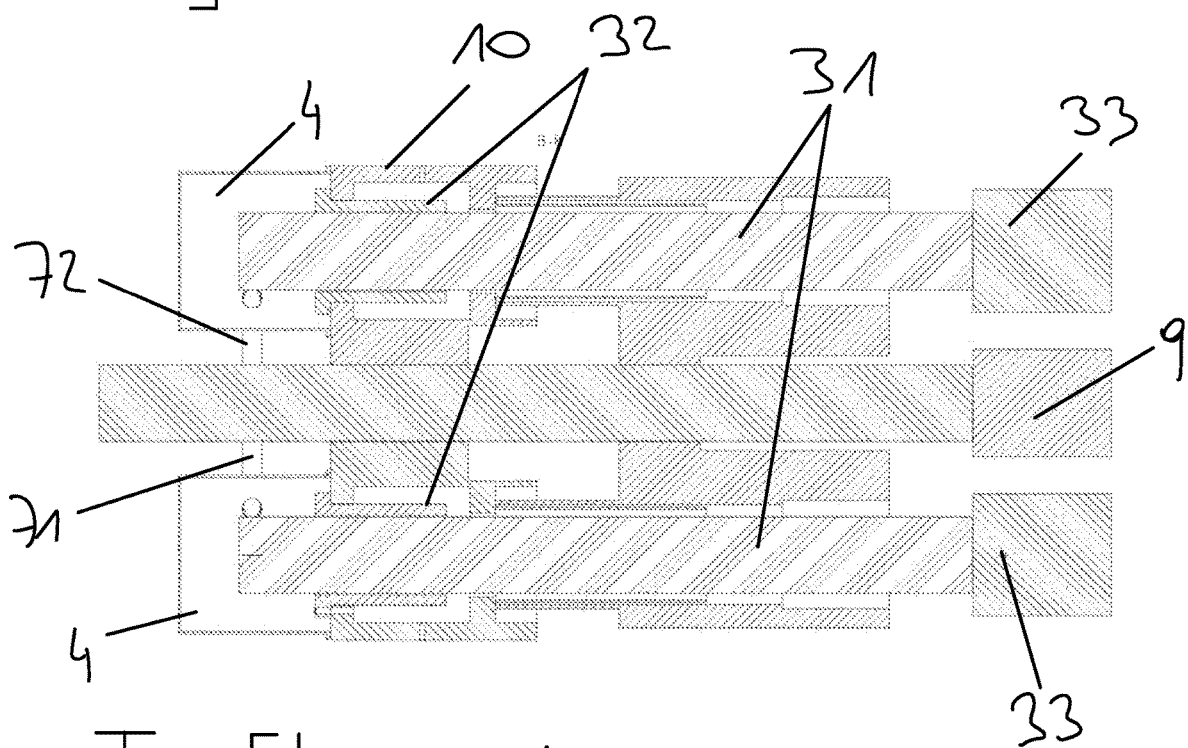
FIGS. 5a-5c are a sectional view along the line B-B, a side view, and a view on the oil chambers of an embodiment of an injection unit.
Figure 5B:
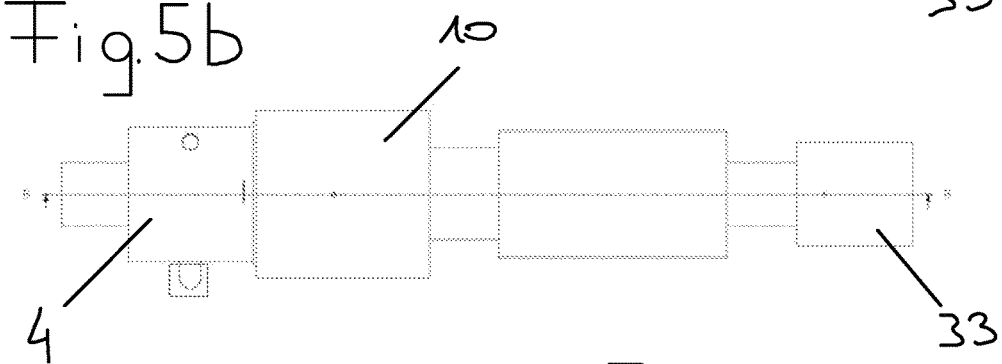
Figure 5C:
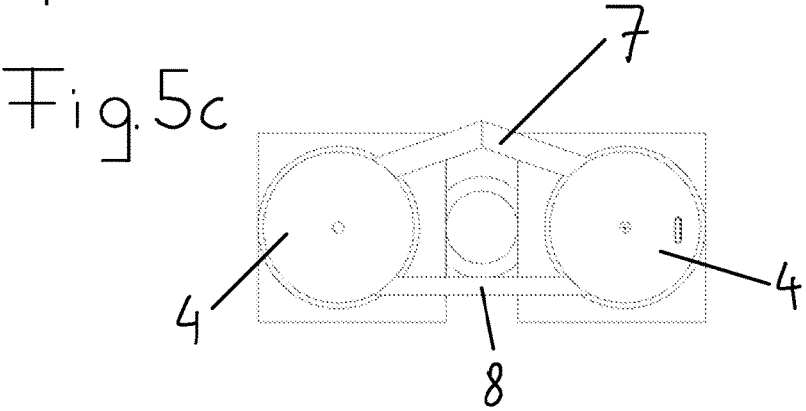

In FIGS. 5a-c the air volumes 6 are connected together in air-conducting relationship by a connecting conduit 7 of the kind as is to be seen in FIGS. 1 through 3.

LIST OF REFERENCES 1 injection unit for a shaping machine
2 injection piston
3 drive unit
   31 spindle of the ball screw drive
   32 nut of the ball screw drive
   33 motor of the drive unit
   34 bearing
4 oil chamber
5 oil volume
6 air volume
7 connecting conduit between the air volumes
   71 portion of the connecting conduit
   72 portion of the connecting conduit
   73 connecting point of the portions of the connecting conduit
8 oil line between the oil volumes
9 rotary drive for injection piston
10 injection bridge
11 pump
12 heat exchanger
13 cooling element

The invention claimed is:

1. An injection unit for a shaping machine comprising:
an injection piston arranged displaceably in an injection cylinder; and
at least two drive units for displacement of the injection piston,
wherein each of the at least two drive units is lubricated by an oil chamber which is oil-tightly sealed off in relation to the surroundings, and each oil chamber holds an oil volume, above which is arranged an air volume, wherein the air volumes of the oil chambers are connected together in air-conducting relationship by a connecting conduit.

2. The injection unit as set forth in claim 1, wherein the connecting conduit includes two portions which respectively extend from one of the oil chambers to a connecting point and meet at the connecting point at an angle different from zero.

3. The injection unit as set forth in claim 1, further comprising an oil conduit which connects the oil volumes of the oil chambers to each other.

4. The injection unit as set forth in claim 3, wherein the oil conduit is part of an oil circuit which has a pump and preferably a heat exchanger.

5. The injection unit as set forth in claim 1, wherein the at least two drive units respectively have a ball screw drive or a toothed rack drive or a roller screw drive or other operatively equivalent machine elements.

6. The injection unit as set forth in claim 1, wherein arranged in at least one of the oil chambers is:
a cooling element, preferably a cooling element having a cooling medium flowing therethrough, and/or
a Peltier element for introducing a heat quantity.

7. A shaping machine, in particular an injection molding machine, comprising the injection unit as set forth in claim 1.

* * * * *